US006391988B1

(12) United States Patent
Hlatky

(10) Patent No.: US 6,391,988 B1
(45) Date of Patent: May 21, 2002

(54) TRIS(PYRAZOYL) BASED ANIONS

(75) Inventor: Gregory G. Hlatky, Morrow, OH (US)

(73) Assignee: Equistar Chemicals L.P., Houston, TX (US)

( * ) Notice: Subject to any disclaimer, the term of this patent is extended or adjusted under 35 U.S.C. 154(b) by 0 days.

(21) Appl. No.: 09/837,069

(22) Filed: Apr. 18, 2001

(51) Int. Cl.$^7$ .............................. C08F 4/16; C08F 4/44; B01J 31/38
(52) U.S. Cl. ................. 526/127; 526/160; 526/161; 526/172; 526/348.6; 502/104; 502/155; 502/162
(58) Field of Search ................. 502/104, 155, 502/162; 526/348.6, 172, 161, 127, 160

(56) References Cited

U.S. PATENT DOCUMENTS

| | | | |
|---|---|---|---|
| 5,064,802 A | 11/1991 | Stevens et al. | |
| 5,504,049 A | 4/1996 | Crowther et al. | |
| 5,539,124 A | 7/1996 | Etherton et al. | |
| 5,554,775 A | 9/1996 | Krishnamurti et al. | |
| 5,599,761 A | 2/1997 | Turner | |
| 5,637,659 A | 6/1997 | Krishnamurti et al. | |
| 5,637,660 A | 6/1997 | Nagy et al. | |
| 5,756,611 A | 5/1998 | Etherton et al. | |
| 5,817,724 A | 10/1998 | Aoki et al. | |
| 5,840,947 A | * 11/1998 | Kuber et al. ................ | 556/8 |
| 6,093,673 A | 7/2000 | Klendworth et al. | |
| 6,180,552 B1 | * 1/2001 | Hlatky et al. ............... | 502/102 |

FOREIGN PATENT DOCUMENTS

| | | |
|---|---|---|
| EP | 0617052 A2 | 3/1994 |
| JP | 10338698 A2 | 12/1996 |
| JP | 09220476 A2 | 8/1997 |

OTHER PUBLICATIONS

Sarl Timonen et al, "Novel Single–site Catalysts Containing a Platinum Group Metal and a Macrocyclic Sulfur Ligand for Ethylene Polymerization," *Journal of Molecular Catalysis A: Chemical* vol. 111 (1996) 267–272.

Licheng Sun et al, "Binuclear Ruthenium—Manganese Complexes as Simple Artificial Models for Photosystem II in Green Plants" *J. Am. Chem. Soc.* 1997, vol. 119, 6996–7004.

S. Vepachedu et al, *Acta Crystallogr., Sect. C: Cryst. Struct. Commun.* (1995), C51 (3), 423–8.

A. Steiner et al., "Sodium tri(pyrazol–1–yl)–germanate and –stannate: New Tridentate 'Claw–ligands' containing group 14 metals," *J. Chem. Soc., Chem. Commun.* (1993), 1702–04.

* cited by examiner

*Primary Examiner*—David W. Wu
*Assistant Examiner*—R. Harlan
(74) *Attorney, Agent, or Firm*—Brooks & Kushman P.C.

(57) ABSTRACT

The present invention provides an olefin polymerization procatalyst that includes at least one multidentate ligand. The pro-catalyst includes a Group 3 to 10 transition or lanthanide meta and one or more anionic or neutral ligands in an amount that satisfies the valency of the metal such that the pro-catalyst has a net zero charge. The present invention also discloses a method for making the pro-catalyst.

22 Claims, No Drawings

TRIS(PYRAZOYL) BASED ANIONS

BACKGROUND OF THE INVENTION

1. Field of the Invention

The invention relates to anionic pyrazolyl, triazolyl, and tetraazolyl-containing ligands ("azacyclic" ligands) and transition metal complexes that contain them. The complexes are valuable pro-catalysts for organic reactions, particularly for olefin polymerizations.

2. Background Art

The chemical industry uses a wide variety of transition metal complexes as catalysts for organic reactions. Olefin polymerization is an important example of such a reaction. While conventional Ziegler-Natta catalysts continue to dominate the industry, highly active metallocene or single-site catalysts that give new polymers with narrow molecular weight distributions, low densities, and good comonomer incorporation are emerging.

Transition metal complexes used to polymerize olefins are normally non-zero-valent metals (e.g., $Ti^{4+}$, $Zr^{4+}$, $Sc^{3+}$) surrounded by anionic ligands (e.g., chloride, alkyl, cyclopentadienyl) that satisfy the valency of the metal and often improve the solubility of the catalyst in the reaction medium. Anionic ligands can dramatically affect catalyst activity and polymer properties. Furthermore, the anionic ligand will affect the stability of the transition metal complexes.

Metallocene polymerization catalysts contain one or two cyclopentadienyl groups as anionic ligands. These serve to stabilize the active catalytic species, modulate the electronic and steric environment around the active metal center, and maintain the single-sited nature of the catalyst. Polymers with narrow molecular weight and composition distributions are formed from these metallocene catalysts.

Another class of anionic ligands is those which are isolobal to the cyclopentadienyl ring; that is, the orbital interaction of the metal with the ligand is similar in both cases. Examples of such ligands are pyrroyl anions, phospholyl anions, and tris(pyrazolyl)borate anions.

Catalysts containing anionic tris(pyrazolyl)borate ligands are known. For example, $VOCl_3$ reacts with potassium tris(pyrazolyl)borate to make a complex that polymerizes ethylene in the presence of an activator such as methyl alumoxane (MAO). Furthermore, the crystal structure of tris(3,5-dimethylpyrazolyl) methylsilane is known. Anionic multidentate ligand are particularly desirable because of the potential for these ligands to enhance the stability of transition metal complexes.

New anionic, multidentate ligands are needed. Particularly valuable ligands would be easy to synthesize from readily available starting materials and could be made in high yields. Such ligands would be valuable for making new transition metal complexes useful as pro-catalysts for olefin polymerization.

SUMMARY OF THE INVENTION

In one embodiment of the present invention, an anionic multidentate ligand is provided. This ligand includes a Group 14 element and at least one azacyclic group. The anionic multidentate ligand is one component of a pro-catalyst suitable for catalyzing the olefin polymerization. The pro-catalyst of the present invention includes a Group 3 to 10 transition or lanthanide metal (M), one or more anionic or neutral ligands in an amount that satisfies the valency of the M, and at least one anionic multidentate ligand.

In another embodiment of the invention, a method for preparing a polymerization pro-catalyst is provided. The method comprises reacting an azacyclic compound having at least one nitrogen atom with a strong base to form an azacyclic salt. The azacyclic salt is reacted with a divalent Group 14 halide to form an anionic ligand. These negatively charged ligands are next reacted with a transition or lanthanide metal complex to form a pro-catalyst.

In yet another embodiment of the invention, a method for preparing a polymerization pro-catalyst is provided. The method comprises reacting an azacyclic compound with a strong base to form an azacyclic salt. The azacyclic salt is reacted with a Group 14 halide to form a substituted metal compound. The trisubstituted metal compound is reacted with a strong base to form an anionic ligand. The anionic ligand is reacted with a transition or lanthanide metal complex to form a procatalyst with at least one multidentate ligand.

In another embodiment of the invention, the procatalyst of the present invention is used to catalyze the polymerization of various olefins.

DETAILED DESCRIPTION OF THE PREFERRED EMBODIMENT(S)

Reference will now be made in detail to presently preferred embodiments and methods of the invention, which constitute the best modes of practicing the invention known to the inventor.

In one embodiment of the present invention, an anionic multidentate ligand is provided. The anionic multidentate ligand of the present invention has the following formula:

$$R_xL_yA \qquad (I)$$

where R is hydrogen, a $C_{1-30}$ alkyl, a $C_{1-30}$ aryl, or a $C_{1-30}$ aralkyl, A is a Group 14 element, L is a substituted or unsubstituted pyrazolyl, triazolyl, or tetrazolyl group, x is 0 to 2, y is 1 to 3 wherein the sum of x and y is equal to 3.

Preferred pyrazolyl groups have the following formula:

(II)

where $R_1$, $R_2$, and $R_3$ are independently hydrogen, a $C_{1-8}$ alkyl group, $C_{6-10}$ aryl group, $C_{7-15}$ aralkyl group, $C_{1-10}$ alkoxy group, $C_{6-14}$ aryloxy group, $C_{1-10}$ dialkylamino group, or $C_{6-15}$ diarylamino group, or any similar group. Such groups may be partially or full halogenated. Two adjacent groups may be joined to form a cyclic structure, as in indazole or tetrahydroindazole. The pyrazolyl groups are sigma-bonded to the Group 14 atom through the 1-nitrogen.

Preferred triazolyl groups are described by the following structures:

(III)

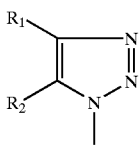

IV where $R_1$ and $R_2$ are as defined above.

Preferred tetraazolyl groups have the following formula:

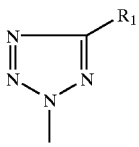

V where $R_1$ is defined above.

In another embodiment of the invention, a transition metal complex useful as a pro-catalyst is provided. The transition metal complex comprises a Group 3 to 10 transition or lanthanide metal (M), one or more anionic or neutral ligands, and the anionic multidentate ligand described above by structure I. Preferred Group 3 to 10 metals comprise Sc, Ti, Cr, Mn, Fe, Co, Ni, and elements directly below these in the Periodic Table. Preferred lanthanide metals include La, Ce, Pr, Eu, Yb, and the like. More preferably, the transition metal complex comprises a Group 3 to 6 transition or lanthanide metal, and most preferably, a Group 4 transition metal. The one or more anionic or neutral ligands are present in an amount such that the valency of M is satisfied. Examples include unsubstituted and substituted cyclopentadienyl, indenyl, fluorenyl, hydride, halide, alkyl, aryl, aralkyl, dialkylamino, siloxy, alkoxy, pyrrolyl, indolyl, carbazoyl, quinolinyl, pyridinyl, azaborolinyl, boraaryl groups, or the like, and combinations of these. Examples of neutral ligands are carbonyl, $\eta^6$-aryl, $\eta^4$-butadiene, $\eta^4$-cyclobutadiene, $\eta^4$-cyclooctatetraene, tertiary phosphine, and the like. Other examples of suitable anionic or neutral ligands appear in U.S. Pat. Nos. 5,756,611, 5,637,659, 5,637,660, 5,554,775, and 5,539,124, the teachings of which are incorporated herein by reference.

In another embodiment of the invention, the transition metal complex further comprises an activator. Generally, the activator converts the complex to a cationically active species. The catalysts are especially valuable for polymerizing olefins, such as ethylene, propylene, and/or other a-olefins such as 1-butene or 1-hexene. Suitable activators are well known in the art. Preferred activators include alumoxanes (e.g., methyl alumoxane (MAO), PMAO, ethyl alumoxane, diisobutyl alumoxane), alkylaluminum compounds (triethylaluminum, diethylaluminum chloride, trimethylaluminum), and the like. Such activators are generally used in an amount within the range of about 0.01 to about 100,000, preferably from about 1 to about 10,000, moles per mole of transition metal complex. Preferred activators also include acid salts that contain non-nucleophilic anions. These compounds generally consist of bulky ligands attached to boron or aluminum. Examples include lithium tetrakis(pentafluorophenyl) borate, lithium tetrakis(pentafluorophenyl) aluminate, anilinium tetrakis (pentafluorophenyl) borate, and the like. These activators are generally used in an amount within the range of about 0.01 to about 1000, preferably from about 1 to about 10, moles per mole of transition metal complex. Suitable activators also include trialkyl or triarylboron compounds such as tris(pentafluorophenyl)boron, tris(pentabromophenyl) boron, and the like. Other suitable activators are described, for example, in U.S. Pat. Nos. 5,756,611, 5,064,802, and 5,599,761, the teachings of which are incorporated herein by reference.

The catalysts are optionally used with an inorganic solid or organic polymer support. Suitable supports include silica, alumina, silica-aluminas, magnesia, titania, clays, zeolites, or the like. The supports can be pretreated thermally or chemically to improve catalyst productivity or product properties. The catalysts can be deposited on the support in any desired manner. For instance, the catalyst can be dissolved in a solvent, combined with a support, and stripped. Alternatively, an incipient-wetness technique can be used. Moreover, the support can simply be introduced into the reactor separately from the catalyst. The ligand can also be chemically tethered to the support through a suitable linking group.

In another embodiment of the invention, a method for preparing a polymerization pro-catalyst is provided. The method comprises reacting an azacyclic compound to form an azacyclic salt. Preferred azacyclic compounds include optionally substituted pyrazole, triazole, or tetrazole. Optionally substituted pyrazole has the structure:

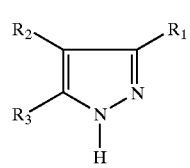

(VI)

where $R_1$, $R_2$, and $R_3$ are independently hydrogen, a $C_{1-8}$ alkyl group, $C_{6-10}$ aryl group, $C_{7-15}$ aralkyl group, $C_{1-10}$ alkoxy group, $C_{6-14}$ aryloxy group, $C_{1-10}$ dialkylamino group, or $C_{6-15}$ diarylamino group, or any similar group. Two adjacent groups may be joined to form a cyclic structure, as in indazole or tetrahydroindazole. Optionally substituted triazole has the following structures:

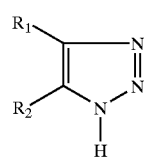

(VII)

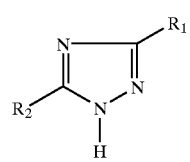

(VIII)

where $R_1$ and $R_2$ are as above. Optionally substituted tetrazole has the structure:

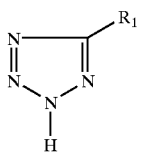

(IX)

where $R_1$ is as above. Specific examples include pyrazole, 3,5-dimethylpyrazole, benzotriazole, tetrazole, and the like. Preferred bases include sodium hydride and potassium hydride. The azacyclic salt is reacted with a halide of a divalent Group 14 element (a metal (II) halide) to form an anionic multidentate ligand. Preferred Group 14 elements include carbon, silicon, germanium, and tin. Preferred halides include tin(II) chloride, germanium (II) iodide, and germanium (II) chloride. These negatively charged ligands are next reacted with a transition or lanthanide metal complex to form a pro-catalyst with at least one anionic mutlidentate ligand.

In another embodiment of the invention, an alternative method for preparing a polymerization pro-catalyst is provided. The method comprises reacting an azacyclic compound having at least one nitrogen atom with a strong base to form an azacyclic salt. Preferred nitrogen azacyclic compounds include substituted and unsubstituted pyrazole, triazole, or tetrazole. Preferred bases include sodium hydride and potassium hydride. The azacyclic salt is reacted with a halide of a Group 14 element in the 4+ oxidation state, e.g., a tetravalent Group 14 element (tetravalent metal halide) having the following formula:

 (X)

where R is hydrogen, a $C_{1-30}$ alkyl, a $C_{1-30}$ aryl, or a $C_{1-30}$ aralkyl, H is hydrogen, X is a halide, A is a Group IV metal such as carbon, tin, lead, and germanium, p is 1–3, and o+p+r=4. The product of this reaction is a substituted metal compound in which the halide is replaced with an azacylcic group. The substituted metal compound has the formula:

 (XI)

where L is a substituted or unsubstituted pyrazolyl, triazolyl, or tetrazolyl group as defined above. Preferred halides include trichlorosilane and chloroform. The substituted metal compound is next deprotonated with a strong base such as butyllithium, lithium diisopropylamide, or butyllithium/potassium t-butoxide to form an anionic ligand. The anionic ligand is reacted with a transition or lanthanide metal complex to form a procatalyst with at least one mutidentate ligand. Preferred transition or lanthanide complexes include metal halides, alkyls, alkoxides, acetates, amides, or the like. A particularly convenient source of the transition metal is the transition metal halide. Examples of such complexes include, $CpZrCl_3$, $ZrCl_4$, vanadium(III) chloride-tetrahydrofuran complex ($VCl_3(THF)_3$), titanium (III)chloride THF complex, titanium(IV) chloride-THF complex, chromium(III)chloride-THF complex, cobalt(II) chloride, nickel(II) bromide, platinum(II)chloride, palladium(II)chloride, lanthanum(III) chloride, titanium(III) acetate, or the like. The pro-catalyst can also be prepared from salts with labile groups, such as tetrakis(acetonitrile) palladium(II) bis(tetrafluoroborate). The transition metal complex is made by dissolving the transition metal source in an organic solvent and then carefully adding the anionic multidentate ligand. Insoluable by-products are removed by filtration. Reaction solvents are removed and the transition metal complex is isolated, washed, and dried. The resulting complex can generally be used without further purification.

In another embodiment of the invention, an olefin polymerization process is provided. The process comprises polymerizing an olefin in the presence of a catalyst of the invention according to methods that are well known in the art. Suitable techniques include gas, high-pressure liquid, slurry, solution, or suspension-phase processes and combinations of these. Suitable olefins include ethylene, propylene, butenes, pentenes, hexenes, octenes, styrenes, 1,3-butadiene, norbornene, and the like. Preferred olefins are ethylene, propylene, and α-olefins such as 1-butene, 1-hexene, and 1-octene.

The following examples illustrate the various embodiments of the present invention. All reactions are carried out in an inert, air-free atmosphere using vacuum line or dry box. All solvents are dry and deoxygenated.

EXAMPLE 1

Preparation of Sodium Pyrazolide

Pyrazole (3.41 g; 50 mmoles) is suspended in toluene (80 ml) and sodium hydride (1.20 g; 50 mmoles) added. The mixture is refluxed overnight and cooled to room temperature. The solid sodium pyrazolide product is filtered off, washed with pentane, and dried.

Preparation of $Cp(Sn(pz)_3)ZrCl_2$

Tin(II) chloride (2.85 g; 15 mmoles) is suspended in tetrahydrofuran (60 ml) and the mixture cooled to −78° C. To this is added slowly a solution of sodium pyrazolide from Example 1 (4.05 g; 45 mmoles) dissolved in tetrahydrofuran (40 ml). The mixture is stirred for 6 hours at 0° C. To this is added $CpZrCl_3$ (4.03 g; 15 mmoles) slurried in tetrahydrofuran (20 ml). The mixture is allowed to warm to room temperature and stirred overnight. The solvent is removed and the residue extracted with toluene (100 ml). The volume of the solution is reduced to 40 ml and cooled to −30° C. The product, $Cp(Sn(pz)_3)ZrCl_2$, is filtered off, washed with pentane, and dried.

EXAMPLE 2

Preparation of Potassium Pyrazolide

Pyrazole (3.41 g; 50 mmoles) is suspended in toluene (80 ml) and potassium hydride (2.01 g; 50 mmoles) added. The mixture is refluxed overnight and cooled to room temperature. The solid potassium pyrazolide product is filtered off, washed with pentane, and dried.

Preparation of $Cp(Si(pz)_3)ZrCl_2$

Trichlorosilane, $HSiCl_3$ (2.03 g; 15 mmoles) is dissolved in tetrahydrofuran (40 ml) and cooled to 0° C. To this is added slowly a solution of potassium pyrazolide, prepared as in Example 2 (4.78 g; 45 mmoles), dissolved in tetrahydrofuran (30 ml). The mixture is stirred at room temperature for 3 hours, cooled to −78° C. and butyllithium (6.0 mL of a 2.5 M solution in hexane) added. After stirring for 2 hours at 0° C., $CpZrCl_3$ (4.03 g; 15 mmoles) slurried in tetrahydrofuran (30 ml) is added slowly. The mixture is allowed to warm to room temperature and stirred overnight. The solvent is removed and the residue extracted with toluene (100 ml). The volume of the solution is reduced to 40 ml and cooled to −30° C. The product, $Cp(Si(pz)_3)ZrCl_2$ is filtered off, washed with pentane, and dried.

EXAMPLE 3

Preparation of Sodium Triazolide 1,2,4-Trizole (3.45 g; 50 mmoles) is suspended in toluene (80 ml) and sodium hydride (1.20 g; 50 mmoles) added. The mixture is refluxed overnight and cooled to room temperature. The solid sodium triazolide product is filtered off, washed with pentane, and dried.

Preparation of Cp(Sn(triaz)$_3$)ZrCl$_2$

Tin(II) chloride (2.85 g; 15 mmoles) is suspended in tetrahydrofuran (60 ml) and the mixture cooled to −78° C. To this is added slowly a solution of sodium triazolide, prepared as in Example 3 (4.10 g; 45 mmoles), dissolved in tetrahydrofuran (40 ml). The mixture is stirred for 6 hours at 0° C. To this is added CpZrCl$_3$ (4.03 g; 15 mmoles) slurried in tetrahydrofuran (20 ml). The mixture is allowed to warm to room temperature and stirred overnight. The solvent is removed and the residue extracted with toluene (100 ml). The volume of the solution is reduced to 40 ml and cooled to −30° C. The product, Cp(Sn(triaz)$_3$)ZrCl$_2$ is filtered off, washed with pentane, and dried.

EXAMPLE 4

Preparation of Sodium Tetrazolide

1-Tetrazole (3.50 g; 50 mmoles) is suspended in toluene (80 ml) and sodium hydride (1.20 g; 50 mmoles) added. The mixture is refluxed overnight and cooled to room temperature. The solid sodium tetrazolide product is filtered off, washed with pentane, and dried.

Preparation of Cp(Sn(tetraz)$_3$)ZrCl$_2$

Tin(II) chloride (2.85 g; 15 mmoles) is suspended in tetrahydrofuran (60 ml) and the mixture cooled to −78° C. To this is added slowly a solution of sodium tetrazolide, prepared as in Example 4 (4.14 g; 45 mmoles), dissolved in tetrahydrofuran (40 ml). The mixture is stirred for 6 hours at 0° C. To this is added CpZrCl$_3$ (4.03 g; 15 mmoles) slurried in tetrahydrofuran (20 ml). The mixture is allowed to warm to room temperature and stirred overnight. The solvent is removed and the residue extracted with toluene (100 ml). The volume of the solution is reduced to 40 ml and cooled to −30° C. The product, Cp(Sn(tetraz)$_3$)ZrCl$_2$ is filtered off, washed with pentane, and dried.

EXAMPLE 5

Preparation of Cp(Sn(pz)$_3$)ZrCl$_2$

Sodium pyrazolide is prepared as described in Example 1. Germanium(II) iodide (2 g, 6.12 mmoles) is suspended in tetrahydrofuran (30 ml) and the mixtured cooled to −78° C. To this is added slowly a solution of sodium pyrazolide from Example 1 (1.66 g; 18.43 mmoles) dissolved in tetrahydrofuran (20 ml). The mixture is stirred for 6 hours at 0° C. To this is added CpZrCl$_3$ (1.60 g; 6.1 mmoles) slurried in tetrahydrofuran (20 ml). The mixture is allowed to warm to room temperature and stirred overnight. The solvent is removed and the residue extracted with toluene (50 ml). The volume of the solution is reduced to 20 ml and cooled to −30° C. The product, Cp(Ge(pz)$_3$)ZrCl$_2$, is filtered off, washed with pentane, and dried.

EXAMPLE 6

Polymerization of Ethylene

Polymerizations are conducted in a stirred 1.7 liter stainless steel autoclave at 80° C. Dry, deoxygenated toluene (840 ml) is charged to the clean, dry, nitrogen-purged autoclave. A 10% methylalumoxane solution in toluene (6 ml) is added to the toluene in the reactor. No additional hydrogen or co-monomer is used. Sufficient ethylene is then added to bring the reactor pressure to 150 psig. A solution of Cp(Sn(pz)$_3$)ZrCl$_2$ is prepared by dissolving 0.36 g of the material in 100 ml of toluene. An aliquot (3 ml) of this solution is pressurized into the autoclave to start the polymerization.

After 1 hour, the ethylene flow is stopped and the autoclave cooled to room temperature. After depressurization, the polymer product is separated from the toluene by vacuum filtration and dried in a vacuum oven.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A catalyst comprising:
   a Group 3 to 10 transition or lanthanide metal, M;
   one or more anionic or neutral ligands in an amount that satisfies the valency of M such that the procatalyst has a net zero charge; and
   an anionic multidentate ligand with the formula R$_x$L$_y$A wherein R is a hydrogen or a C$_{1-30}$ alkyl, aryl, or aralkyl, A is a Group 14 element, L is an azacyclic group, x is 0 to 2, y is 1 to 3 wherein the sum of x and y is equal to 3, and wherein R is bonded directly to A and each L is bonded directly to A through a nitrogen atom of L.

2. The catalyst as recited in claim 1, further comprising an activator.

3. The catalyst of claim 2 wherein the activator is selected from the group consisting of alumoxanes, alkylaluminum compounds, alkylboron compounds, non-nucleophilic borate and aluminate salts, and mixtures thereof.

4. The catalyst of claim 1 wherein the transition metal complex comprises a Group 3 to 6 transition or lanthanide metal.

5. The catalyst of claim 1 wherein M is a Group 4 transition metal and the oxidation state of M is 4+.

6. The catalyst of claim 1 wherein L is selected from the group consisting of:

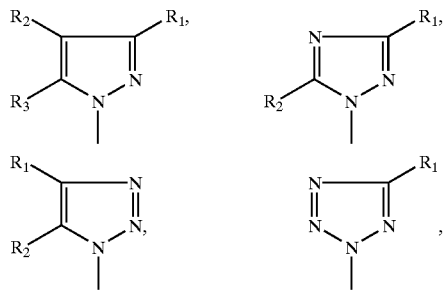

and mixtures thereof.

7. The catalyst of claim 6 wherein the A is tin, x=0, and y=3.

8. The catalyst of claim 6 wherein the A is germanium, x=0, and y=3.

9. The catalyst of claim 6 wherein the A is silicon, x=0, and y=3.

10. The catalyst of claim 1, further comprising a support material wherein the catalyst is attached to the support material.

11. A process which comprises polymerizing an olefin in the presence of a transition metal complex catalyst comprising:

a Group 3 to 10 transition or lanthanide metal, M;

one or more anionic or neutral ligands in an amount that satisfies the valency of M such that the catalyst has a net zero charge; and an anionic multidentate ligand with the formula $R_xL_yA$ wherein R is a hydrogen or a $C_{1-30}$ alkyl, aryl, or aralkyl, A is a Group 14 element, L is an azacyclic group, x is 0 to 2, y is 1 to 3 wherein the sum of x and y is equal to 3, and wherein R is bonded directly to A and each L is bonded directly to A through a nitrogen atom of L.

12. The process of claim 11 wherein the olefin is ethylene or a mixture of ethylene and an α-olefin.

13. The process of claim 11, further comprising an activator.

14. The process of claim 13 wherein the activator is selected from the group consisting of alumoxanes, alkylaluminum compounds, alkylboron compounds, non-nucleophilic borate and aluminate salts, and mixtures thereof.

15. The process of claim 11 wherein M comprises a Group 3 to 6 transition or lanthanide metal.

16. The process of claim 11 wherein M is a Group 4 transition metal and the oxidation state of M is 4+.

17. The process of claim 11 wherein L is selected from the group consisting of:

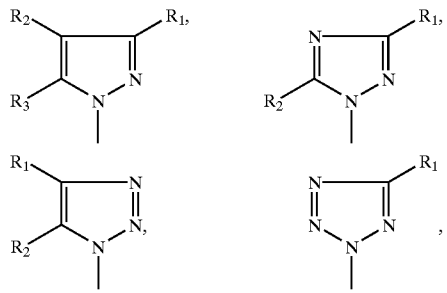

and mixtures thereof.

18. The process of claim 11 wherein A is tin, x=0, and y=3.

19. The process of claim 11 wherein A is germanium, x=0 and y=3.

20. The process of claim 11 wherein A is silicon, x=0 and y=3.

21. The process of claim 11, further comprising a support material wherein the catalyst is contained on the support material.

22. The catalyst of claim 3, wherein A is Si, Ge, or Sn.

* * * * *